(12) United States Patent
Mo

(10) Patent No.: US 8,448,344 B2
(45) Date of Patent: May 28, 2013

(54) DIGITAL LENS GAUGE

(75) Inventor: Albert Mo, Toronto (CA)

(73) Assignee: McCray Optical Supply Inc., Toronto (CA)

( * ) Notice: Subject to any disclaimer, the term of this patent is extended or adjusted under 35 U.S.C. 154(b) by 321 days.

(21) Appl. No.: 13/069,629

(22) Filed: Mar. 23, 2011

(65) Prior Publication Data

US 2012/0240420 A1    Sep. 27, 2012

(51) Int. Cl.
*G01B 5/20* (2006.01)

(52) U.S. Cl.
USPC .......................................................... 33/507

(58) Field of Classification Search
USPC .................................................. 33/200, 507
See application file for complete search history.

(56) References Cited

U.S. PATENT DOCUMENTS

| | | | |
|---|---|---|---|
| 3,242,581 A * | 3/1966 | Wagener | 33/507 |
| 4,403,420 A | 9/1983 | Rarick | |
| 5,121,550 A * | 6/1992 | Wood et al. | 33/507 |
| 5,317,811 A | 6/1994 | Berwick | |
| 5,432,596 A | 7/1995 | Hayashi | |
| 5,640,775 A * | 6/1997 | Marshall | 33/200 |
| 5,742,381 A | 4/1998 | Ueno | |
| 2009/0007444 A1* | 1/2009 | Shibata | 33/200 |

* cited by examiner

*Primary Examiner* — G. Bradley Bennett
(74) *Attorney, Agent, or Firm* — Aaron Edgar; Gowling Lafleur Henderson LLP

(57) ABSTRACT

A handheld digital lens clock device is disclosed for measuring front and back dioptric power of eyeglass lenses based on curvature and refractive index. The device includes a reference probe, a measuring probe for measuring a sagittal depth of a lens relative to the reference probe and a digital display to show the measurement information. The device can further include a refractive index input button that allows the device to measure the optical power of lens composed of materials having different refractive indices. The device can further include a calibration button that is used to set a reference or zero reading by placing the reference probes and measuring probe on a flat surface. A tube level can also be included on the device to assist orienting the device when taking measurements.

13 Claims, 5 Drawing Sheets

DIGITAL LENS GAUGE

FIELD

The present disclosure relates to devices for measuring an eye glass lens, and more particularly for measuring the optical power of a lens.

BACKGROUND

Dispensing opticians often need to measure the optical power of a lens to duplicate prescriptions or distinguish between lenses. Opticians can calculate the optical power of a lens by measuring the curvature of the surfaces of the lens. Lenses constructed from different material have a different refractive index, and thus a lens with the same curvature but constructed from a different material will have a different optical power.

In order to measure the curvature of the lens and the lens power, a device that is referred to as a lens clock, lens gauge or clock gauge is used. Traditional lens clocks are mechanical devices that have a graduated dial and a needle to indicate the lens power of the device in diopters. The graduated dial of a typical lens clock is calibrated to display the optical power of crown glass which has a refractive index of 1.523. Nowadays few people actually wear lenses constructed from crown glass as a number of new materials are both lighter and less expensive. If an optician is measuring a lens made from a material other than crown glass, the optician must convert the diopter reading from the lens clock by applying a corrective factor. Applying this corrective factor can be a time consuming and possibly error prone task for the optician.

The construction of a traditional lens clock includes two fixed outer probes with a center probe in between that moves up and down against spring tension in a line perpendicular to the line between the two fixed pins. Failure to orient the probes perpendicular to the lens surface can affect the accuracy of the lens clock measurement. The center probe is integrated with a rack that rotates a pinion gear to translate the up and down motion of the plunger to the rotary motion of the needle that indicates the optical power on the graduated dial. The dial is typically graduated in quarter diopter increments that limits the precision and accuracy of the lens clock and can also be a source of observational errors. Mechanical variation and orientation of the pinion gear or rack due to temperature or manufacturing variance can also lead to measurement error that is compounded when making larger measurements that require more rotations of the pinion gear.

Prior to measuring the power of a lens using a traditional lens clock, the lens clock must be calibrated to read zero when the probes are placed on a flat surface. Typically, this requires the optician to manually adjust the center pin of the lens clock, usually by rotating the center pin, and then testing the adjustment by placing the lens clock on a flat surface. This process is repeated until the optician is satisfied that the lens clock is calibrated. This calibration process can be time consuming and another source of error affecting the measurements from the lens clock. Calibration also typically requires an additional tool to rotate the center pin.

SUMMARY

Accordingly, there is a need for a lens clock that improves the accuracy of measurements. Improvements to accuracy can be made through improved orientation of the lens clock during measurement and improved calibration of the lens clock. There is also a need for a lens clock that accounts for different refractive indices to measure lenses made from differing materials.

According to a first aspect, a handheld device is provided for measuring a lens, the device comprises a reference probe, a measuring probe to measure a displacement of the measuring probe relative to reference probe, a display to show measurement information corresponding to the displacement of the measuring probe, and a controller to calculate measurement information based on the displacement of the measuring probe, the controller coupled to the display to provide the display with the measurement information. In a related aspect, the device can include a refractive index input that is coupled to the controller to provide refractive index information. The controller can calculate optical power based on the displacement and refractive index information. In some aspects, the refractive index input can include a refractive index button that can be used to select the refractive index information. In a related aspect, the refractive index button can select the refractive index information from a group of commonly used eyeglass lens materials. In another aspect, the handheld device can include a level sensor for indicating the orientation of the handheld device. In yet another aspect, the handheld device can include a calibration button to set a reference measurement for the measuring probe to calibrate the handheld device.

DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein, or a portion thereof, may be implemented in computer programs executing on a programmable device comprising at least one processor, a computer memory (including volatile and non-volatile memory), at least one input source, and at least one output source. For example, and without limitation, the programmable device can include a microcontroller or microprocessor. Program code may operate on input data to perform the functions described herein and generate output data.

Figure 1:
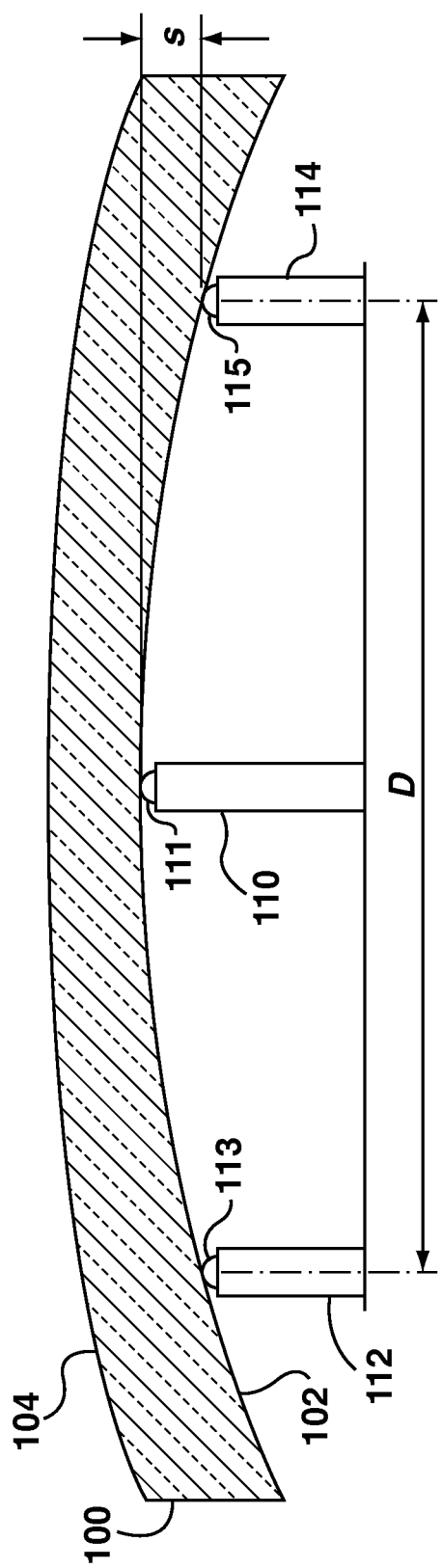
FIG. 1 is a side cross-sectional view of a lens illustrating lens clock probes measuring the sagittal depth of concave surface of the lens.

Reference is first made to FIG. 1, shown is a side cross-sectional view of lens 100 illustrating lens clock probes measuring the sagittal depth of concave surface 102 of lens 100. Center measuring probe 110 makes contact with concave surface 102 of lens 100 near the center of concave surface 102. Center measuring probe 110 is typically spring loaded to retract and extend to meet the surface of lens 100. Outer static reference probes 112, 114 make contact with the outer portions of concave surface 102 and are a fixed distance apart, indicated as D in FIG. 1. The sagittal depth of the curve of concave surface 102 is measured from the displacement of center measuring probe 110 relative to reference probes 112, 114 and is indicated as s in FIG. 1. Convex surface 104 can be similarly measured. Each of the center measuring probe 110 and outer reference probes 112, 114 can have highly polished ball tips 111, 113 and 115, respectively, to prevent scratching the surface of lens 100.

The optical power of the of a lens surface in diopters can be determined by the following equation:

$$\phi = \frac{2(n-1)s}{(D/2)^2}$$

where n is the refractive index of the material of lens 100, s is the sagittal depth between the center measuring probe 110 and outer reference probes 112, 114 in millimeters, and D is distance separating outer reference probes 112, 114 in centimeters. Alternatively, the denominator in the equation can be simplified to the squared distance between a measuring probe and one of the outer reference probes. A traditional lens clock is calibrated to display the power of a crown glass lens that has a refractive index of 1.523.

A diopter is proportional to the reciprocal of the focal length of the lens measured in meters. Thus, a 3 diopter lens focuses parallel rays of light at ⅓ of a meter. The benefit of quantifying a lens in terms of its optical power is that when relatively thin lenses are placed close together their optical powers approximately add. Thus a thin 2-diopter lens placed close to a thin 0.5-diopter lens yields almost the same focal length as a 2.5-diopter lens.

Modern eyeglass lenses are typically not constructed from crown glass since other materials are lighter, less expensive and more shatter resistant. The refractive index of these other materials can range from 1.49 to 1.9. With crown glass and a sagittal depth of 1 mm with outer reference probes 112, 114 spaced 2.5 cm apart the calculated optical power is 0.66944 diopters. Using a 0.25-diopter graduated dial on a traditional lens clock this measurement could be read as 0.75 diopters (nearest 0.25 diopter measurement) or estimated as 0.625 (nearest 0.125 diopter measurement). Using these same measurements, a lens material with a lower refractive index of 1.49 (i.e. n=1.49) has a calculated optical power of 0.6272 diopters, and a lens material with a higher refractive index of 1.8 (i.e. n=1.8) has a calculated optical power of 1.024 diopters. The refractive index of the material strongly influences the optical power of the lens as the above calculations show that the optical power can vary by up to 0.50 diopters depending on the lens material for a sagittal depth of only 1 millimeter.

As the above calculations illustrate, if an optician is using a traditional lens clock calibrated to crown glass to measure the optical power of a lens made of another material then the reading from the lens clock must be corrected for the difference in the refractive index.

Figure 2:
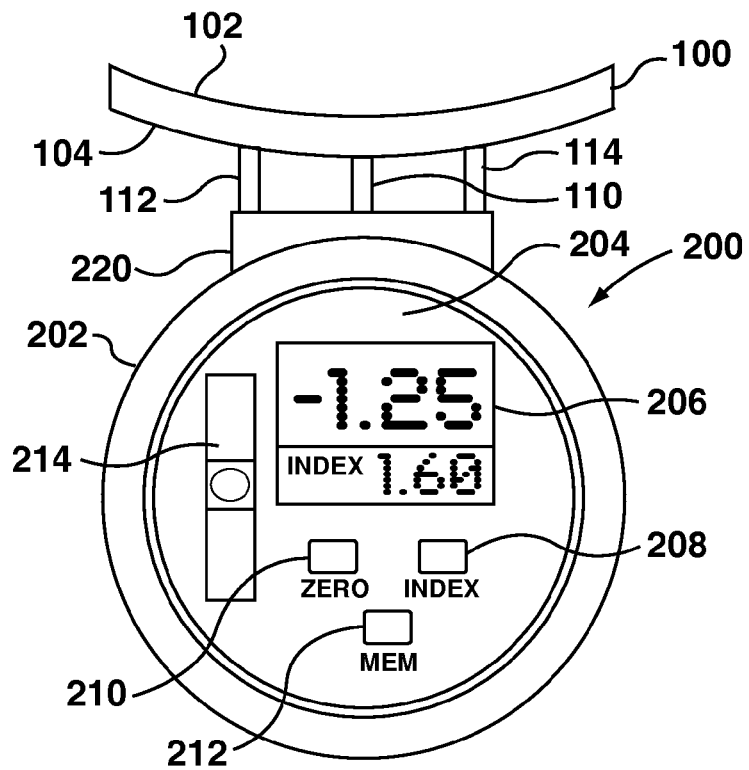
FIG. 2 is a front view of an embodiment of a digital lens gauge shown measuring convex surface of a lens.

Referring now to FIG. 2, a front view of an embodiment of digital lens gauge 200 is shown measuring convex surface 104 of lens 100. Digital lens gauge 200 is a portable and handheld device for measuring lenses. Digital lens gauge 200 has a housing 202 to which center and reference probes 110, 112 and 114 are connected. Housing 202 has face 204 containing display 206 for displaying measurement information. Display 206 is an electronic/digital display that can be implemented using a low-cost segmented LED or LCD display, or pixel-based displays known to those in the art. Display 206 can also illustrate the refractive index that is selected by the user of digital lens gauge 200 using refractive index button 208. Pressing refractive index button 208 can be used to cycle through a number of refractive indices for commonly used lens material with selected refractive index shown on display 206. For example, pressing refractive index button 208 can cycle through the following list, or a subset thereof, of commonly used refractive indices: 1.49; 1.523 (crown glass); 1.56; 1.60; 1.67; 1.7; 1.74; 1.8; and 1.9.

The term "button" is used herein to refer to any user interface object through which a user of the digital lens gauge 200 can interact to provide input to the device. The term button as used herein refers to both hardware buttons and software buttons such that the term could incorporate switches, keyboards, touch sensors, including but not limited to capacitive or resistive sensors, and touch screen interfaces, such as on display 206, that display a button. Digital lens gauge 200 could also receive refractive index input from other means such as a refractive index sensor that can determine the refractive index of a lens or from an audio or optical interface.

Digital lens gauge 200 can also include a zero button 210 that is used to calibrate digital lens gauge 200. Zero button 210 can also be referred to as calibration button 210. To calibrate digital lens gauge 200, center probe 110 and reference probes 112, 114 should be placed on a flat, level surface and zero button 210 should be pressed to register this flat surface as a zero reference reading.

Some embodiments of digital lens gauge 200 can include a memory button 212 that can be used to store an optical power reading in memory within digital lens gauge 200. Memory button 212 can also provide an additive memory function where a measurement stored in memory is added to the current measurement. This function can be used to sum the power of lens surfaces 102, 104 to determine the total power of lens 100. For example, an optician may first measure convex surface 104, storing the result using memory button 212, and then when measuring concave surface 102 sum the measurements by pressing memory button 212 to display total lens power on display 206.

Other embodiments of digital lens gauge 200 could further include a mode button to toggle digital lens gauge 200 between displaying different measurement information. Example measurement information can include the sagittal depth in millimeters, the radius of curvature of the lens surface, focal length of the lens and optical power in diopters. Display 206 can include an indicator for the measurement information of the current mode.

Digital lens gauge 200 can also include level sensor 214 to indicate that digital lens gauge 200 is properly oriented with respect to lens 100. If lens 100 is held vertically then level sensor 214 can be positioned on digital lens gauge 200 to determine that digital lens gauge 200 is perpendicular to lens 100 and oriented horizontally. Alternatively, level sensor 214 can be positioned on digital lens gauge 200 to determine if digital lens gauge 200 is oriented vertically when measuring lens 100 placed on a horizontal surface. Level sensor 214 can be implemented as a tube level, such as that shown in FIG. 2, a bull's eye level or any other type of spirit level known in the art. Digital lens gauge 200 can include more than one bubble level to allow digital lens gauge 200 to be correctly oriented in more than one direction.

Level sensor 214 can also comprise electronics to indicate whether digital lens gauge 200 is correctly oriented. Signals from an electronic level sensor can be used to trigger a level warning indicator on display 206 to alert an optician that the measurement may not be accurate. In some embodiments, tips 111, 113 and 115 of probes can also include a contact sensor using any number of known electronic sensors (e.g. resistive, pressure, capacitance). The contact sensors can be used to trigger an indicator on display 206 to show that probes are not in contact with lens 100, or alternatively, as a power saving feature to turn off display 206 when digital lens gauge is not in contact with lens 100.

Center probe 110 and reference probes 112, 114 extend from probe housing 220. Probe housing 220 is preferably precision manufactured from a rigid material to maintain the distance between the connected reference probes 112, 114, whereas housing 202 can be constructed from plastic. Reference probes 112, 114 are typically spaced apart by 20 to 30 mm.

Probe housing 220 can be oriented with respect to housing 202 of digital lens gauge 200 in a number of ways. Probe housing 220 can be oriented so that probes extend from either the top, bottom or sides with respect to housing 202. Alternatively, housing 202 can be rotatable upon probe housing 220, and further provide a mechanical click fit at 90 degree rotations.

Although probes are shown extending parallel with the face 204 in FIG. 2, other embodiments can have probes extending perpendicular to face 204 (i.e. into the page in FIG. 2). This arrangement could allow a bulls eye level sensor to be placed on face 204 to assist with orienting the digital lens gauge 200.

Other embodiments of digital lens gauges can have other configurations for the reference probe and measuring probe. For example, the two outer probes could be configured to move in tandem acting as the measuring probe with the centre probe remaining static as the reference probe. Alternatively, a single reference probe can be used that is formed as an annular ring with the moveable measuring probe in the center, or the annular ring could act as the measuring probe with a static centre reference probe. Other alternatives could employ three reference probes evenly spaced 120 degrees apart with the measuring probe disposed in the center.

Figure 3:
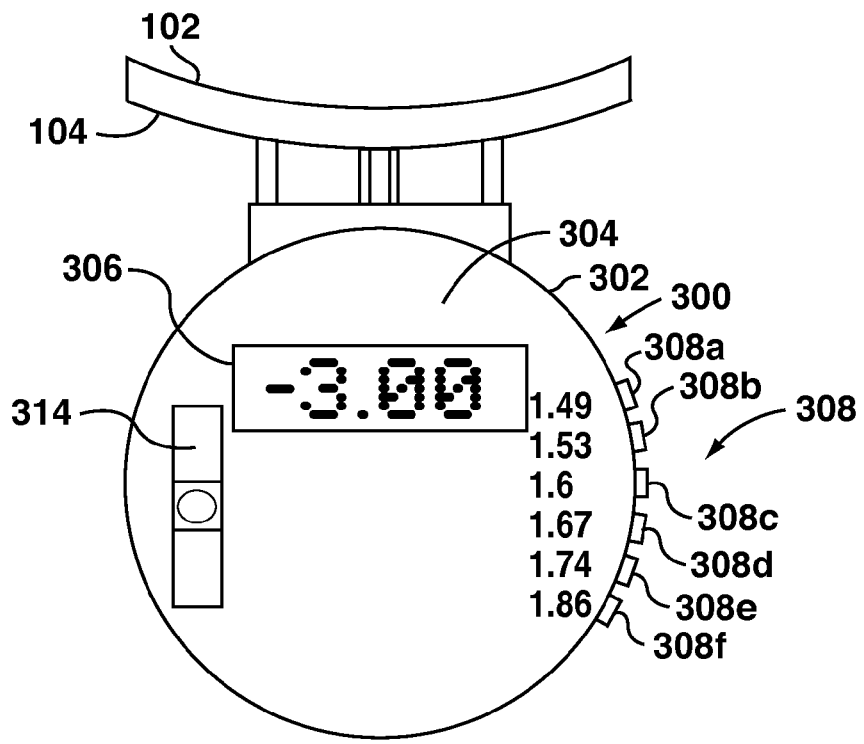
FIG. 3 is a front view of an alternative embodiment of a digital lens gauge shown measuring convex surface of a lens.

Referring now to FIG. 3, a front view of an alternative embodiment of digital lens gauge 300 shown measuring convex surface 104 of lens 100. Digital lens gauge 300 comprises housing 302 that includes a number of refractive index selection buttons 308 on an outer edge of housing 302. Each refractive index button 308a-f correspond to a refractive index printed on face 304 that is used to select the particular refractive index of the lens under measurement. A zero button to calibrate digital lens gauge 300 can also be located on the edge of housing 302. Digital lens gauge 300 further includes a segmented LCD display 306 and level sensor 314.

Figure 4:
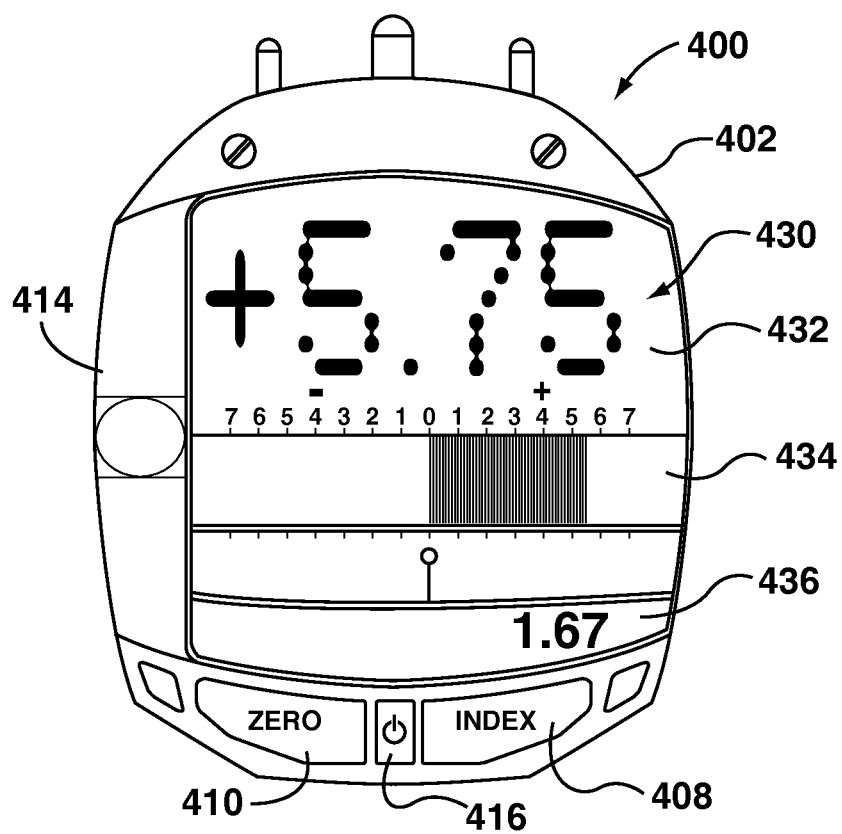
FIG. 4 is a front view of an alternative embodiment of digital lens gauge is shown having an alternate display within the housing.

Referring now to FIG. 4, a front view of an alternative embodiment of digital lens gauge 400 is shown having an alternate display 430 within housing 402. Display 430 includes a dioptric value display section 432 to display a numerical value, in diopters, corresponding to the optical power of the lens under measurement. Display 430 also includes a visual display scale 434 that includes ruled markings that delineate a negative scale to the left and a positive scale to the right for indicating optical power in diopters. Visual display scale 434 is controlled to display bars underneath the scale to indicate the optical power. Visual display scale 434 can be a helpful visual aid to assist in correctly reading measurement from digital lens gauge 400.

Display 430 can also include an index display section 436 for displaying a numeric value for the selected refractive index. The refractive index can be selected using index button 408 to cycle through a list of commonly used refractive indices. Digital lens gauge 400 can further include zero button 410 that is used to calibrate digital lens gauge 400 with a zero reading. Power button 416 is used to turn on and off digital lens gauge 400. Tube level 414 can be integrated with housing 402 to form an edge of digital lens gauge 400 such that tube level 414 can be viewed from either the front, back or edge of digital lens gauge 400.

Figure 5:
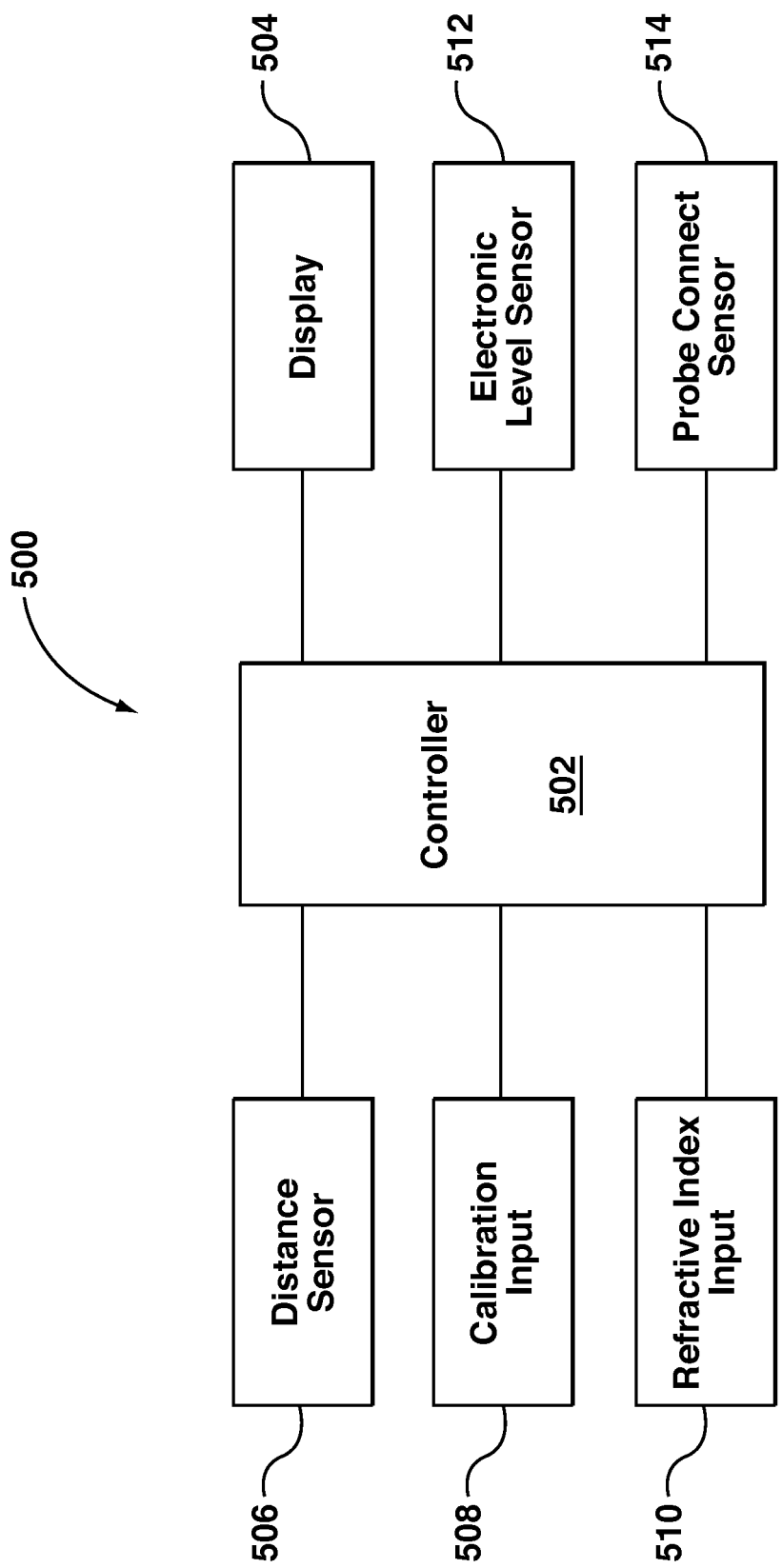
FIG. 5 is a block diagram illustrating the electronic components of an embodiment of a digital lens gauge.

Referring now to FIG. 5, a block diagram illustrating the electronic components of an embodiment of digital lens gauge 500 is shown. Digital lens gauge 500 includes a controller 502 that is used to interface with a number of inputs, process input data to calculate measurement information and control display 504 to display measurement information. Controller 502 can be implemented as a microcontroller, a processor with memory, or custom logic, including but not limited to a system-on-a-chip architecture, implemented as hardware in an FPGA or ASIC. Operations performed by controller 502 can thus be implemented in either hardware or software, or a combination of both. Controller 502 and other electronic components can receive electrical power from a power source that can be controlled through a switch, such as, for example, power button 416. Example power sources can include but are not limited to batteries, capacitors or solar cells.

The main function of controller 502 is to receive distance information from distance sensor 506 and to use the distance information to calculate an optical power or other measurement information that is then output to display 504. The distance between the reference probes and the refractive index is also used in the calculation of optical power by controller 502. Distance sensor 506 monitors the displacement of a measuring probe, such as center measuring probe 110, to measure the sagittal depth of the lens. Distance sensor 506 can be similar to those used in electronic calipers, such as but not limited to those that employ a linear encoder and scale. In such embodiments, distance sensor 506 can use any suitable linear encoder that uses any one or more of acoustic, ultrasound, capacitive, electric field, inductive, electromagnetic (e.g. Hall effect-type) and optical components for determining relative or absolute distance information. The measuring probe can include a scale that is read by a linear encoder of distance sensor 506.

Distance sensor 506 can be calibrated by calibration input 508 that effectively resets the zero reading or reference reading for distance sensor 506. Calibration input 508 effectively sets the reference measurement for the measuring probe with respect to the reference probes. Typically, calibration is performed by resetting a position counter either in distance sensor 506 or in controller 502. Calibration input 508 can be a signal generated by a button mounted to housing of digital lens gauge 500. In some embodiments, the scale imprinted on the measuring probe may have a reference mark that distance sensor 506 can use for self-calibration without the need for an external calibration reset.

Refractive index input 510 provides refractive index information to controller 502. Refractive index information can be either a numerical refractive index or a signal to the controller 502 to select a refractive index from a group of refractive indices supported by digital lens gauge 500. Refractive index input 510 can include a button, such as refractive index buttons 208, 308 and 408 for example. Refractive index input 510 can trigger controller 502 to update display 504 with the refractive index information. Controller 502 utilizes the refractive index information provided by refractive index input 510 when calculating measurement information, such as, for example, optical power.

Some embodiments of digital lens gauge 500 can optionally include electronic level sensor 512 connected to controller 502 that provides orientation information about digital lens gauge 500. The orientation information can be used by controller 502 to provide an orientation warning on display 504 to alert a user of digital lens gauge that the device may not be correctly oriented (e.g. the device is not vertically or horizontally aligned). Other embodiments of digital lens gauge 500 can also include a probe contact sensor 514 connected to controller 502. Similar to electronic level sensor 512, probe contact sensor 514 can provide probe contact information to controller 502 that can be used by controller to provide a probe contact warning on display 504 to alert that all of the probes are not in contact with a surface. Other embodiments of digital lens gauge 500 can provide for a memory button input connected to a button, such as memory button 212 described with respect to FIG. 2, in order to instruct controller 502 to store measurement information in memory and provide an additive memory function.

Figure 6:
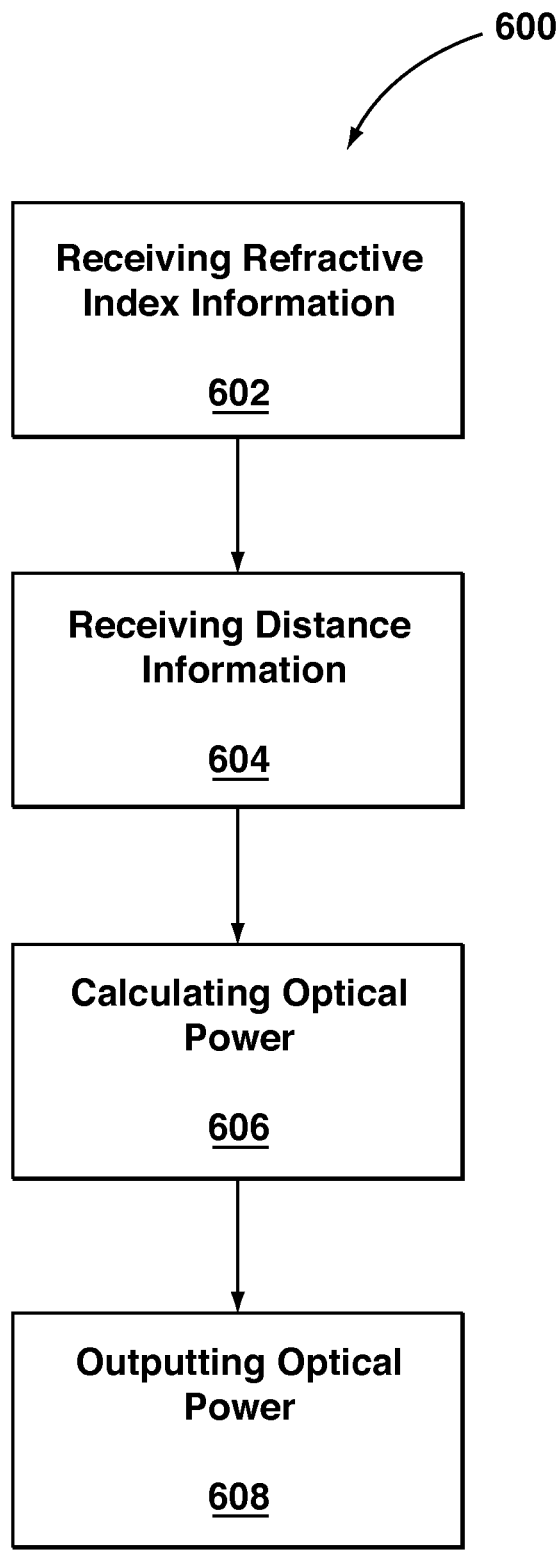
FIG. 6 is a flow chart illustrating a method of calculating optical power.

Referring now to FIG. 6, a method 600 of calculating optical power is shown. At operation 602, refractive index information is received. The refractive index information corresponds to a selection of a numeric refractive index value. The refractive index information can be provided through button input from a user of digital lens gauge, such as but not limited to refractive index input 510 described above.

At operation 604, distance information is received. The distance information can correspond to a measurement of the sagittal depth of a lens. For example, distance sensor 506 can provide information about the absolute or relative displacement of a measuring probe, such as center measuring probe 110. In some embodiments, a calibration operation can be performed to calibrate a zero measurement when the measuring probes and reference probes are on the same plane (e.g. a flat surface).

Next, at operation 606, the optical power is calculated. Optical power can be calculated by controller 502 using the refractive index information and distance information received in operations 602 and 604, respectively. Optical power calculation can also take into account the distance between reference probes (e.g. distance D in FIG. 1) that can be stored in memory in controller 502. Alternative embodiments can employ reference probes that move inwards and outwards from the centre probe to allow for measuring smaller or larger lenses. In these embodiments, distance information from distance sensor 506 can further include the distance between the reference probes. Controller 502 in calculating optical power in operation 606 can use the optical power equation described with respect to FIG. 1. Finally, once the optical power is calculated, the optical power can be output to display 504 so that it can be read by a user of digital lens gauge 500 at operation 608.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A handheld device for measuring a lens, the device comprising:
at least one reference probe;
at least one measuring probe to measure a displacement of the at least one measuring probe relative to the at least one reference probe;
a display to show measurement information corresponding to the displacement of the measuring probe; and
a controller to calculate the measurement information based on the displacement of the at least one measuring probe, the controller coupled to the display to provide the display with the measurement information.

2. The handheld device of claim 1, further comprising:
a refractive index input coupled to the controller for providing refractive index information.

3. The handheld device of claim 2 wherein the measurement information is optical power that is calculated by the controller based on the displacement and refractive index information.

4. The handheld device of claim 3 wherein the refractive index input includes a refractive index button.

5. The handheld device of claim 4 wherein the refractive index button selects the refractive index information from a group of refractive indices for commonly used eyeglass lens materials.

6. The handheld device of claim 5 wherein items of the group of refractive indices are selected from any one of: 1.49; 1.523; 1.56; 1.60; 1.67; 1.7; 1.74; 1.8; and 1.9.

7. The handheld device of claim 5 wherein the display shows the refractive index information.

8. The handheld device of claim 3 wherein the measurement information is selected from any one of group consisting of: sagittal depth, the radius of curvature and focal length.

9. The handheld device of claim 1 further comprising a level sensor for indicating orientation of the handheld device.

10. The handheld device of claim 9 wherein level sensor is a tube level.

11. The handheld device of claim 1 further comprising a calibration button to set a reference measurement for the measuring probe to calibrate the handheld device.

12. The handheld device of claim 3 wherein the optical power calculated by the equation:

$$\phi = \frac{2(n-1)s}{d^2}$$

where n is the refractive index information, s is the displacement of the at least one measuring probe relative to the at least one reference probe, and d is a distance between the axis of the at least one measuring probe and the at least one reference probe.

13. The handheld device of claim 1 wherein the measuring probe includes a distance sensor for measuring displacement.

* * * * *